United States Patent [19]

Topper et al.

[11] Patent Number: 4,814,863
[45] Date of Patent: Mar. 21, 1989

[54] DETECTION AND CONCEALING ARTIFACTS IN COMBED VIDEO SIGNALS

[75] Inventors: Robert J. Topper, Hatboro, Pa.; Lee R. Dischert, Burlington, N.J.

[73] Assignee: Matsushita Electric Industrial Co., Ltd., Kadoma, Japan

[21] Appl. No.: 60,096

[22] Filed: Jun. 9, 1987

[51] Int. Cl.$^4$ .............................................. H04N 9/78
[52] U.S. Cl. ........................................ 358/31; 358/36
[58] Field of Search .................................. 358/31, 36

[56] References Cited

U.S. PATENT DOCUMENTS

| | | | |
|---|---|---|---|
| 4,178,609 | 12/1979 | Beutel | 358/31 |
| 4,241,363 | 12/1980 | Maeyama et al. | 358/31 |
| 4,656,501 | 4/1987 | Casey et al. | 358/31 |

FOREIGN PATENT DOCUMENTS

| | | | |
|---|---|---|---|
| 150688 | 11/1980 | Japan | 358/31 |
| 46385 | 4/1981 | Japan | 358/36 |
| 111596 | 7/1983 | Japan | 358/31 |
| 117887 | 7/1984 | Japan | 358/36 |
| 151592 | 8/1984 | Japan | 358/31 |

*Primary Examiner*—John W. Shepperd
*Attorney, Agent, or Firm*—Amster, Rothstein & Ebenstein

[57] ABSTRACT

Keying signals indicating locations along the lines of a raster where artifacts resulting from combing a video signal occur is derived by a one line subtractive filter, a clipping circuit and a one line AND device and means are provided for replacing video signals in said location with artifact free signals at the same location in either adjacent line if such are available and providing a signal that can be used to set up notch filter rather than combed operation if the corresponding locations on both adjacent lines also contain artifacts.

7 Claims, 5 Drawing Sheets

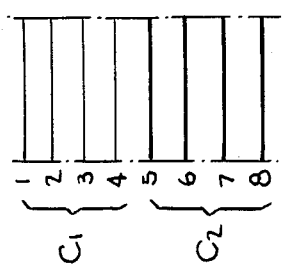
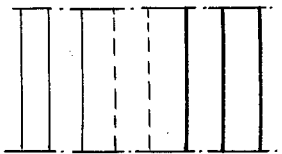
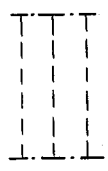
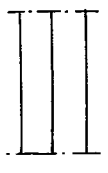
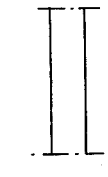
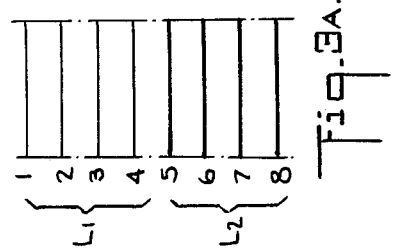
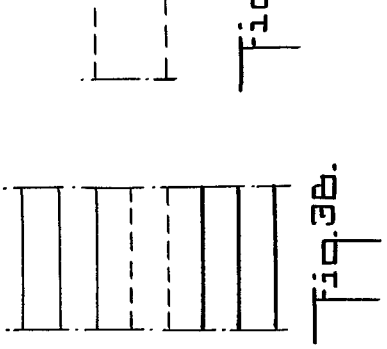
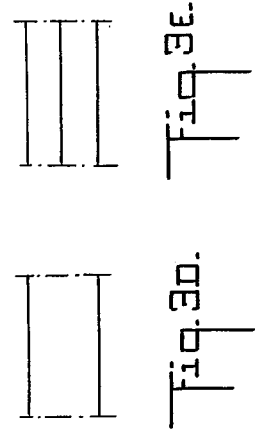

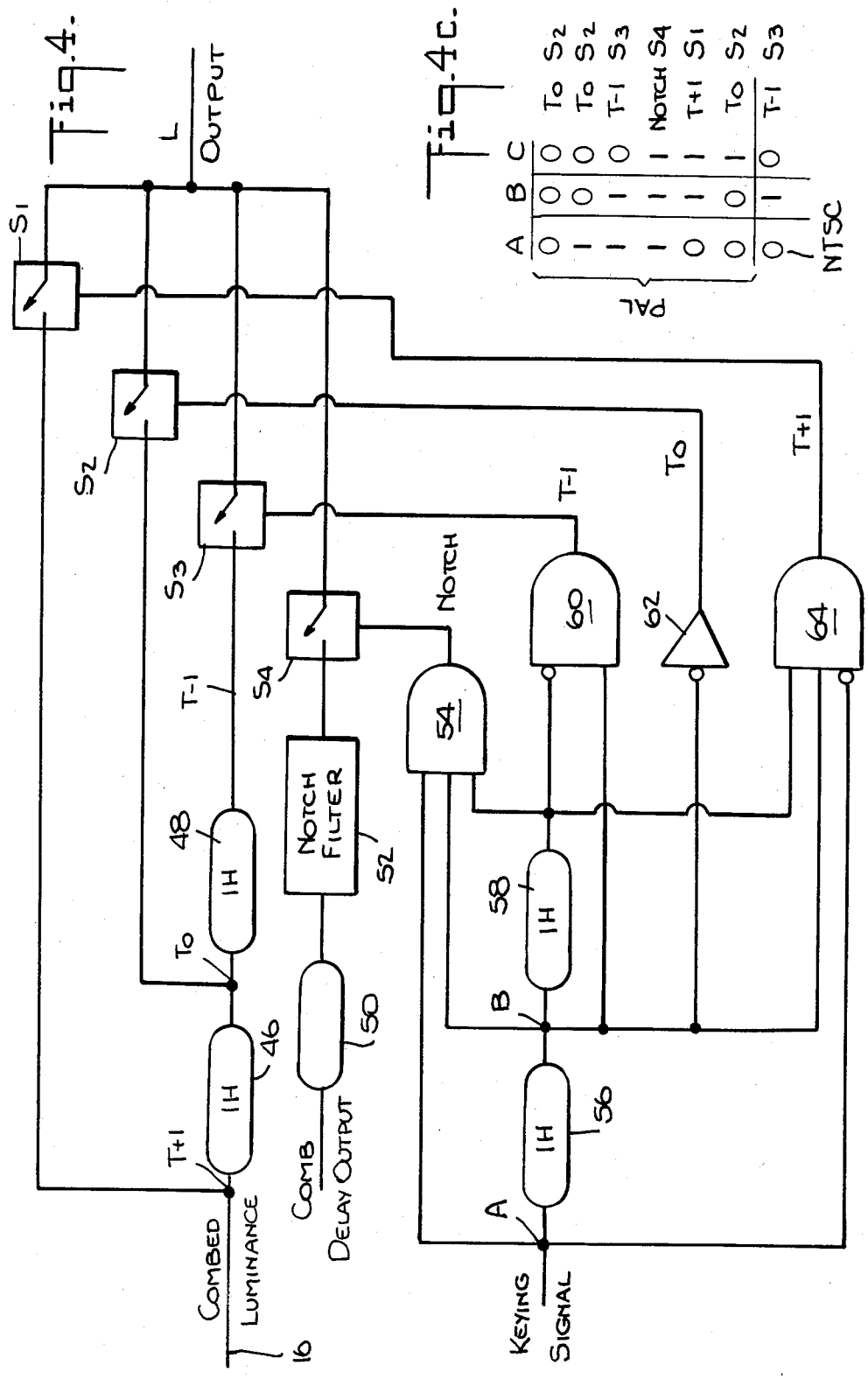

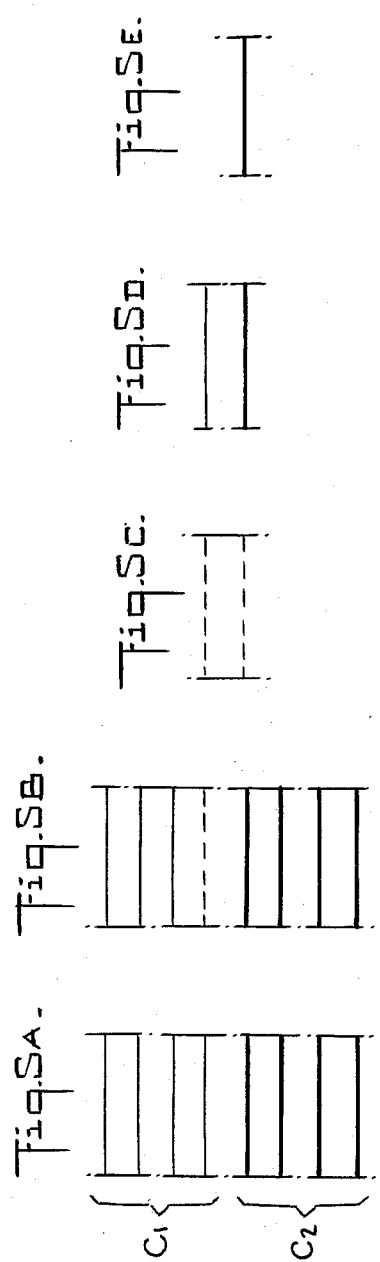

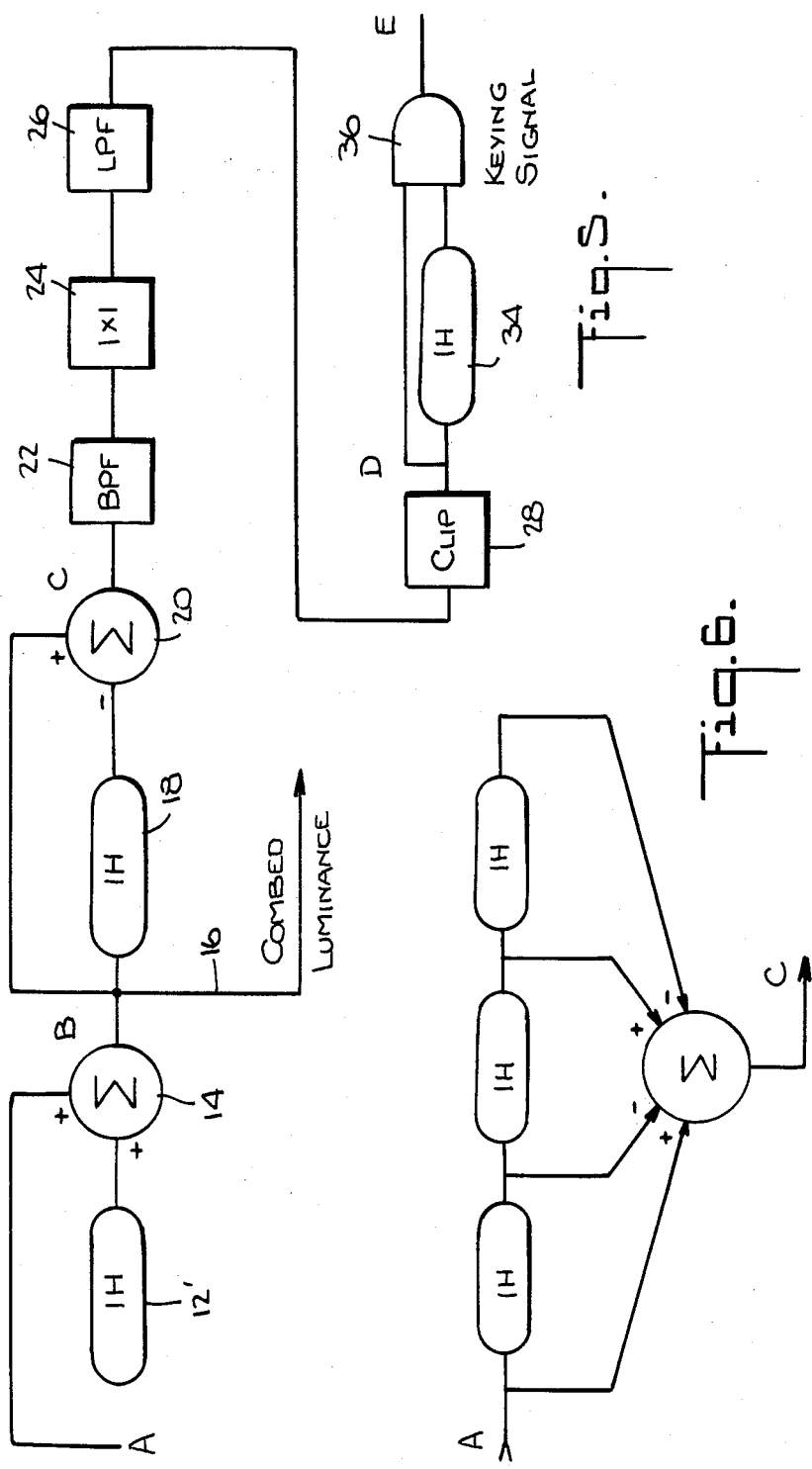

DETECTION AND CONCEALING ARTIFACTS IN COMBED VIDEO SIGNALS

BACKGROUND OF THE INVENTION

In both the NTSC and PAL color television systems the luminance information is conveyed in a wide band and the color information is conveyed by modulation of a subcarrier that is fairly high up in the band. In order to separate the luminance signal from the color signal a notch filter is used to exclude the color subcarrier and its sidebands, but in order to avoid ringing the notch filter starts reducing the amplitude of the luminance signal at frequencies as low as 2.0 MgHz so that much of the luminance detail is lost.

In order to increase the amplitude of the higher frequency luminance components without contaminating them with the subcarrier and its sidebands, comb filters have been used. They basically operate on the principle that the luminance signals of two scanning lines can be added together if the color subcarrier components on the two lines are out of phase so as to cancel. In the NTSC system, the subcarrier is out of phase on adjacent lines so that what is termed a one line comb filter is used to delay one line by a line scanning interval before that line is added to the next. In the PAL system the color subcarrier is out of phase at two line intervals so that a two line comb filter must be used.

In both cases, however, any difference in phase or amplitude of the subcarrier components or any vertical change in luminance occurring in the lines being added will prevent perfect cancellation and produce artifacts that may make the picture worse. Circuits have been provided that remove the comb filter and permit notch filter operation when this condition becomes too severe. Thus, you either have comb filter operation or notch filter operation.

BRIEF SUMMARY OF THE INVENTION

In accordance with this invention circuitry is provided that detects the artifacts produced at any point along a line by a comb filter and produces a keying signal that can be used to control circuits for concealing the artifacts. The latter can be accomplished by substituting lines or portions of lines without artifacts for lines or portions of lines that have artifacts. If there are a group of more than two consecutive lines having artifacts at any given location along the lines, artifact free video signals from corresponding location of lines adjacent the top and bottom lines of the group of lines are substituted in the top and bottom lines, and notch filter operation is set up for the lines in between.

Briefly, the artifacts are detected by coupling a one line delay in series with the comb filter used for enhancement of the high frequency components of the luminance signal and deriving the difference between the signals at opposite ends thereof. The difference will include the difference between color subcarrier components as well as any difference in luminance components appearing along adjacent lines and will appear as an A.C. signal. After it is passed through a band pass filter, an absolute value circuit and a low pass filter, it is clipped at a threshold value depending on the signal to noise ratio and passed through a one line delay. The input and output of the one line delay are ANDED to produce the keying signal. When the threshold value is exceeded, a keying signal is provided at any point along a line that can be used to control the substitution of one line or portion thereof for another or portions thereof and for causing notch filter operation.

In a PAL system what is called a line filling circuit is inserted immediately after the clipper for reasons that will be explained.

BRIEF DESCRIPTION OF THE DRAWINGS

FIGS. 2A through 2E illustrate signals occurring at certain points in FIG. 1 and are used in the explanation of the operation thereof, FIGS. 3A through 3F are signals used in explaining the operation of the line fill circuit referred to, FIG. 4 is a logic circuit that responds to the keying signal to select the correct portion of a line for display and may be used in a PAL, in an NTSC system, FIG. 4A illustrates the operation of FIG. 4 when artifacts occur at corresponding locations of only two adjacent lines, FIG. 4B illustrates the operation of FIG. 4 when artifacts occur at corresponding locations f more than two consecutive lines, FIG. 4C is a truth table for FIG. 4, FIG. 5 is a block diagram illustrating how the invention is incorporated in an NTSC system, FIGS. 5A through 5E are signals used in explaining the operation of FIG. 5, and FIG. 6 shows an alternative arrangement of the filters between points A and C of FIG. 1 or FIG. 5.

DETAILED DESCRIPTION OF THE INVENTION

Figures 1, 1A:
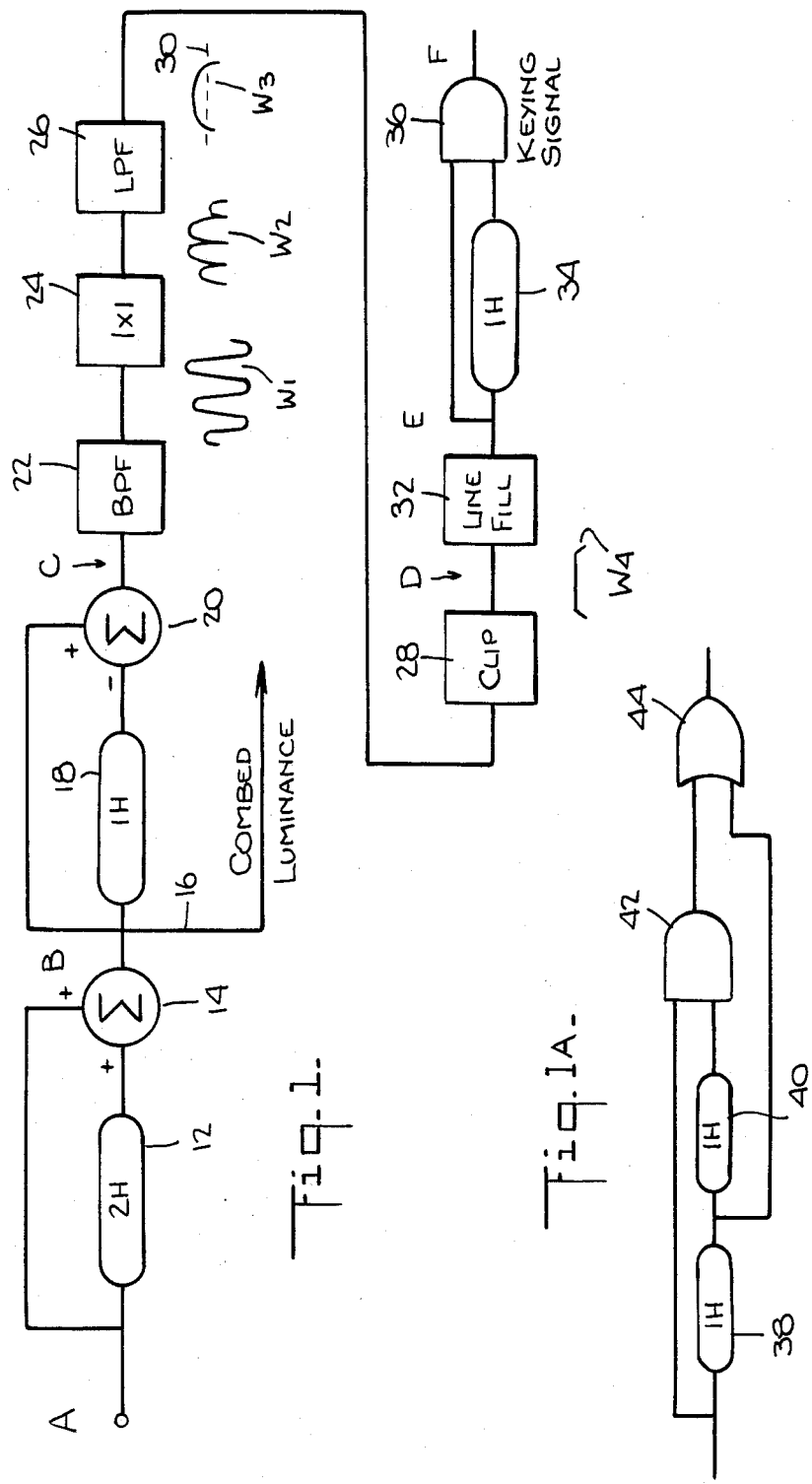
FIG. 1 is a block diagram of an artifact detection circuit for a PAL system.
FIG. 1A is a schematic diagram of a line fill circuit used on FIG. 1.

FIG. 1 illustrates a way of using the circuit of the invention in a PAL system. A composite PAL video signal is applied to an input terminal 10, and a two line delay line 12 is connected between the terminal 10 and one input of a summer 14. The delay line 12 and the summer 14 constitute a two line summing comb. The terminal 10 is coupled directly to the other input of the summer 12. Thus lines of video signal that are two lines apart are respectively applied to the inputs of the summer 14. For purposes of explanation it is assumed that the composite video signal includes consecutive line 1 through 4 of one color $C_1$ and four subsequent lines 5 through 8 of another color $C_2$. The color signals are in the form of a color subcarrier having an amplitude and phase required by the color. When identical lines of video that are two lines apart are respectively applied to the inputs of the summer 14, the color subcarrier components cancel each other so as to produce a pure luminance signal on an output lead 16 that is equal to the sum of the luminaure signals on the two lines. When the lines of video respectively applied to the inputs of the summer 14 are not identical, as would be the case when one has a color $C_1$, and the other a color $C_2$, the color signals do not cancel but produce artifacts in the luminance signal as indicated by the dashed lines 4 and 5 in FIG. 2B.

In accordance with this invention a one line delay line 18 is connected between the output of the summer 14 and the inverting input of a summer 20, and its non inverting input is connected to the output of the summer 14. The one line delay 18 and the summer 20 constitute a one line substracting or difference comb. For the purpose of detecting artifacts the combs can be used in either order. This will produce three lines of artifact at the output C of the summer 20 as illustrated in FIG. 2C. The frequency components close to the color subcarrier are selected by a bandpass filter 22 so as to produce an A.C. wave $W_1$. The envelope of $W_1$ is derived in any suitable manner as by a full wave rectifier 24 so as to produce a wave $W_2$, and a low pass filter 26 is coupled to the output of the rectifier 24 so as to produce a wave $W_3$ that is the envelope of $W_2$. A clipper 28 clips $W_3$ at an adjustable level indicated by a dashed line 30 so as to produce a signal $W_4$ that is illustrated in FIG. 2D. This can not be used as a keying signal indicative of the presence of artifact because it occurs during three lines whereas the artifacts of FIG. 2B occurred during two lines. A keying signal indicating the presence of artifact during the appropriate lines is obtained by passing the signal $W_4$ for each line through a line filling circuit 32 to be explained to a one line ANDING circuit comprised of a one line delay line 34 connected between the output of the line fill circuit 32 and one input of an AND device 36 a connection from the output of the line fill circuit 32 and another input of the AND device 36. The described keying signal appearing at the output of the AND device 36 occurs during the appropriate two lines as indicated in FIG. 2E.

In the interest of simplification it has been assumed that the colors $C_1$ and $C_2$ are the same throughout the lines in which they respectively occur but in an actual case they will vary throughout the lines so that artifact may not be produced throughout an entire line. In this event the keying signal, which is a logic high, will occur only at points where artifacts occur along the line.

Whereas the circuit of FIG. 1 as thus far described works well for vertical chroma transitions such as illustrated in FIG. 2A, a problem arises in the presence of vertical luminance transitions from areas of low horizontal frequency to areas of high horizontal frequency, e.g. the top line of a multiburst, such as illustrated in FIG. 3A i.e., $L_1$ is a low frequency luminance signal and $L_2$ is a high frequency. This will produce artifacts as illustrated by the dashed lines in FIG. 3B. Whereas the artifacts occur in the same lines as FIG. 2B, they are in phase so as to cancel each other at the output of the summer 20 and produce artifacts as indicated in FIG. 3C in which the middle line is missing. If these lines of artifact are processed by the circuit of FIG. 1 so as to produce signals as illustrated in FIG. 3D at the output of the clipper 28 and applied directly to the one line delay AND circuit 34, 36, no keying signal is produced. In order to prevent this from occurring, a line fill circuit 32 such as illustrated in FIG. 1A can be used.

The line fill circuit of FIG. 1A is comprised of 1H delays 38 and 40 connected in series between the output of the clipper circuit 28 and one input of an AND gate 42 and a direct connection between the output of the clipper circuit 28 and another input of the AND gate 42. In addition, one input of an OR gate 44 is connected to the output of the AND gate 42, and the other input of the OR gate 44 is connected to the junction of the 1H delay lines 38 and 40. Those skilled in the art of logic circuits will understand that the output of the OR gate 44 will be as shown in FIG. 3E in which the middle line is restored so that it looks like FIG. 2D. As previously explained, the 1H AND circuit 34, 36 will produce keying signals during the lines where artifact occurred as indicated in FIG. 3F. The line fill circuit will not change the signals of FIG. 2D caused by color artifacts.

Having derived keying signals indicating where artifacts occur along each line emerging from the two line comb on lead 16, whether they be caused by color or luminance signals, it now remains to provide means for concealing them. Before proceding with a description of the circuit of FIG. 4 which performs this function, reference is made to FIGS. 4A and 4B to see how the artifacts are concealed in an PAL system. In a situation such as illustrated in FIG. 4A wherein there are only two adjacent portions combed lines 3 and 4 having artifacts, the concealment is carried out by substituting line 2 for line 3 and line 5 for line 4. In a situation such as illustrated in FIG. 4B where there are more than two consecutive combed lines having artifacts at corresponding locations such as lines 3–7 of FIG. 4B, portions of line 2 are substituted for portions of line 3 and portions of line 7 are substituted for portions of line 6. Notch filter operation is performed during portions of lines 4 and 5 having artifacts at corresponding locations so that the comb filter is not used.

In FIG. 4 the combed luninance signal on the lead 16 is applied to a luminance output terminal L via a normally open switch $S_1$, a one line delay line 46, a normally open switch $S_2$ and via the one line delay line 46, a one line delay line 48 and a switch $S_3$. The output of the two line comb delay 12 is coupled via a one line delay 50, a notch filter 52 and a switch $S_4$ to the luminance output terminal L.

The keying signal at the output of the AND gate 36 of FIG. 1 is applied so as to close the appropriate one of the switches $S_1$–$S_4$ by the following logic circuit having a truth table as shown in FIG. 4C. The keying signal is applied directly to one input of an AND gate 54, via a one line delay line 56 to another input of the AND gate 54 and via the one line delay line 56 and a series one line delay 58 to a third input of the AND gate 54. The output of 54 is connected to the switch $S_4$. The output of the one line delay 58 is connected to an inverting input of an AND gate 60, and the output of the one line delay 56 is applied to a second input of the AND gate 60. The output of 60 is connected to the switch S3 The output of the one line delay 56 is connected via an inverter 62 to the switch $S_2$. The keying signal is applied to an inverting input of an AND gate 64, via the one line delay 56 to another input of the gate 64 and via the one line delays 56 and 58 to a third input of the gate 64. The output of the AND gate 64 is connected to the switch $S_1$.

The points A, B and C respectively indicate the keying signal, without delay, with a one line delay and with a two line delay. In the upper portion of the circuit for luminance, the signal $T_o$ at the junction of the one line delays 46 and 48 arbitrarily refers to the current line, T+1 on the input side of the one line delay 46 is the next line and T−1 at the output of the one line delay 48 is the previous line. In the truth table of FIG. 4C a 1 indicates that the keying signal is high as is the case when artifacts are present and a 0 indicates that the keying signal is low as is the case when artifacts are not present. The keying signals respectively appear at points A, B and C in the logic circuit when the combed luminance signal respectively appears at T+1, T0 and T−1. The switches closed in each combination of the values of keying signals at the points A, B and C are also indicated in the truth table. The operations defined by the truth table are as follows:

000, 100, 001—no artifact so use To 110, 010—corresponding portion of line above, T−1, does not have artifacts 111—corresponding portions of circuit line lines lines above and below it have artifacts 011—corresponding portion of line below, T+1, does not have artifacts Reference is now made to FIG. 5 for a description of a way of using this invention in an NTSC system. Components that correspond to those of FIG. 1 are designated in the same way. In an NTSC system the color subcarrier is out of phase on adjacent lines of a field so that the comb filter uses a one line comb 12′ in place of the two line delay 12 of FIG. 1. Another difference is that a line fill circuit such as 32 is not required.

FIG. 5A is the same as FIG. 2A wherein the top four lines indicate a color $C_1$ and the bottom four lines indicate a color $C_2$. FIG. 5B shows that the output of the comb formed by the one line delay 12′ and the summer 14 contains only one dashed line of artifact so that there are two lines of output from the clipper circuit 28 and only one line of keying signal.

FIG. 6 shows an alternative arrangement that can be placed between A and C of FIG. 1. Three one line delays 66, 68 and 70 are connected in series, and the ends of each delay are connected to a summer 72.

The vertical resolution of the luminance is reinserted after the output of the circuit of FIG. 4, but these circuits are well known to those skilled in the art and are not part of this invention.

We claim:

1. A circuit for reducing the effect of artifacts in a luminance signal obtained by combining lines of television video signals having a color carrier superimposed on luminance signals comprising:

a summing comb for producing combed luminance signals and a difference comb linearly coupled to form a series circuit, demodulation means coupled to said series circuit, means coupled to said demodulation means for providing keying signals at locations along the lines of a raster where artifacts due to vertical changes in luminance signals or in the color represented by said color carrier appear in said combed luminance signals, said means for providing keying signals including a one line ANDING circuit, clipping means coupled between said demodulation means and said one line ANDING circuit for coupling signals provided by said demodulation means to said one line ANDING circuit that represent amplitudes in excess of a predetermined value, and combed luminance signal modifying means coupled to said summing comb and responsive to said keying signal for replacing said combed luminance signals at said locations along one line where said keying signal is provided with combed luminance signals at corresponding locations along an adjacent line when said keying signal is not provided.

2. A circuit as set forth in claim 1 further comprising: a notch filter, and means included in said luminance signal modifying means for connecting said notch filter to said summing comb at locations where said keying signals are provided on said one line and both lines adjacent thereto.

3. A circuit as set forth in claim 1 further comprising: a line fill circuit coupled between said clipping means and said one line ANDING circuit, said line fill circuit being comprised of an ANDING means having two inputs and an output, one of said inputs being connected to said clipping means, two one line delays meeting at a junction connected in series between the other input of said ANDING means and said clipping means, and an ORING means having two inputs and an output, one of said inputs being connected to said junction of said one line delays, the other input being connected to the output of said ANDING means and the output of said ORING means being connected top said one line ANDING circuit.

4. A circuit as set forth in claim 1 further comprising: a line fill circuit coupled between the output of said clipping means and said one line ANDING means, said line fill circuit being comprised of:

an ANDING means having two inputs and an output, one of said inputs being connected to the output of said clipping means first and second one line delays meeting at a junction an connected in series between the other input of said ANDING means and the output of said clipping means, and an ORING means having two inputs and an output, one input being connected to the output of said ANDING means, the other input being connected to the junction of said one line delays, and the output being connected to said one line ANDING circuit.

5. A circuit as set forth in claim 4 further comprising: an output terminal, means for coupling luminance signals derived by said summing comb to said output terminal at locations along one line of a raster in the absence of a keying signal for said locations, said means for coupling replacing luminance signals derived by said summing comb at locations along said one line with other luminance signals derived by said summing comb at corresponding locations of a line adjacent said one line if a keying signal occurs at said locations of said one line and not at corresponding locations of said adjacent line, and said means for coupling passing luminance signal derived by said summing comb at locations along said one line of said raster to said output terminal via a notch filter if keying signals occur at said latter locations on said one line and both lines adjacent thereto.

6. A circuit for providing keying signals indicative of the presence of artifacts occurring as video signals from corresponding locations along different raster lines are added, said video signals having a modulated color carrier superimposed on a luminance signal, said circuit comprising:

a summing comb for deriving luminance signals, a one line subtracting comb for deriving color signals linearly connected in series with said summing comb, demodulating means for deriving the envelope of signals passing through said summing comb and said subtracting comb, clipping means coupled to said demodulating means for providing a signal at an output thereof when the output of said demodulating means exceeds a given amplitude, and a one line ANDING circuit coupled to the output of said clipping means for producing keying signals.

7. A circuit as set forth in claim 6 further comprising:

an output terminal, means for coupling luminance signals derived by said summing comb at locations along one line of a raster to said output terminal in the absence of a keying signal for said locations, means for replacing luminance signals derived by said summing comb at locations along said one line with other luminance signals derived by said summing comb at corresponding locations of a line adjacent said one line if a keying signal occurs at said locations of said one line an not at corresponding locations of said adjacent lines, and means for passing luminance signals derived by said summing comb at locations along said one line of said raster to said output terminal via a notch filter if keying signals occur at said latter locations on said one line and both lines adjacent thereto.

* * * * *